(12) United States Patent
Seacat

(10) Patent No.: US 11,613,871 B2
(45) Date of Patent: Mar. 28, 2023

(54) SYSTEMS AND METHODS FOR COUPLING AN IMPLEMENT TO A WORK VEHICLE

(71) Applicant: CNH Industrial America LLC, New Holland, PA (US)

(72) Inventor: Daniel Owen Seacat, Park City, KS (US)

(73) Assignee: CNH Industrial America LLC, New Holland, PA (US)

( * ) Notice: Subject to any disclaimer, the term of this patent is extended or adjusted under 35 U.S.C. 154(b) by 967 days.

(21) Appl. No.: 16/401,807

(22) Filed: May 2, 2019

(65) Prior Publication Data

US 2020/0347573 A1 Nov. 5, 2020

(51) Int. Cl.
- *E02F 9/00* (2006.01)
- *F16D 3/82* (2006.01)
- *F16D 3/26* (2006.01)
- *F16D 127/06* (2012.01)

(52) U.S. Cl.
CPC ............... *E02F 9/006* (2013.01); *F16D 3/26* (2013.01); *F16D 3/82* (2013.01); *F16D 2127/06* (2013.01); *F16D 2300/12* (2013.01)

(58) Field of Classification Search
CPC ........ E02F 3/3663; E02F 3/3636; E02F 9/006
See application file for complete search history.

(56) References Cited

U.S. PATENT DOCUMENTS

| | | | |
|---|---|---|---|
| 3,441,091 A | 4/1969 | Helling | |
| 3,705,656 A * | 12/1972 | Hunger | E02F 3/3636 414/723 |
| 3,913,684 A | 10/1975 | Casey et al. | |
| 4,150,504 A | 4/1979 | Asche | |
| 4,153,117 A | 5/1979 | Freese | |
| 4,286,674 A | 9/1981 | Noble et al. | |
| 4,462,172 A | 7/1984 | Caron | |
| 4,488,850 A | 12/1984 | Wernimont | |
| 5,040,615 A | 8/1991 | Fletcher | |
| 5,528,843 A | 6/1996 | Rocke | |
| 6,241,455 B1 | 6/2001 | Schupback et al. | |
| 6,301,811 B1 | 10/2001 | Gilmore, Jr. | |

(Continued)

FOREIGN PATENT DOCUMENTS

| | | |
|---|---|---|
| EP | 0104302 | 4/1984 |
| FR | 1350332 | 1/1964 |

(Continued)

OTHER PUBLICATIONS

U.S. Appl. No. 16/401,813, filed May 2, 2019, Kenneth Herrig.

*Primary Examiner* — Gerald McClain
(74) *Attorney, Agent, or Firm* — Peter Zacharias; Patrick Sheldrake

(57) ABSTRACT

A system configured to couple an implement to a work vehicle includes a first lock assembly coupled to an arm of the work vehicle, and the first lock assembly includes a first lock, a second lock, and a first actuator configured to drive the first lock and the second lock laterally outwardly to engage respective first openings formed in the implement. The system also includes a second lock assembly coupled to a frame of the work vehicle, and the second lock assembly includes a third lock, a fourth lock, and a second actuator configured to drive the third lock and the fourth lock laterally outwardly to engage respective second openings formed in the implement.

19 Claims, 9 Drawing Sheets

(56) References Cited

U.S. PATENT DOCUMENTS

| | | |
|---|---|---|
| 6,332,747 B1 * | 12/2001 | Lee .................. E02F 3/3636 37/468 |
| 6,860,705 B1 | 3/2005 | Dietrich et al. |
| 6,962,475 B2 | 11/2005 | Fatemi |
| 7,426,796 B2 | 9/2008 | Cunningham et al. |
| 7,494,314 B2 | 2/2009 | Bares et al. |
| 7,618,229 B2 | 11/2009 | Boling et al. |
| 7,832,127 B2 | 11/2010 | Hill |
| 8,240,970 B2 | 8/2012 | Bricker et al. |
| 8,408,862 B1 | 4/2013 | Westendorf |
| 8,596,901 B1 | 12/2013 | Popp |
| 8,646,545 B1 | 2/2014 | Elliott |
| 8,821,104 B2 | 9/2014 | Yasuda et al. |
| 9,334,623 B2 | 5/2016 | Billaud |
| 2010/0024412 A1 | 2/2010 | Hyodo et al. |
| 2010/0071987 A1 | 3/2010 | Hyodo et al. |
| 2010/0076652 A1 | 3/2010 | Hyodo et al. |
| 2011/0313625 A1 | 12/2011 | Miller et al. |
| 2012/0004814 A1 | 1/2012 | Hyodo et al. |
| 2014/0212846 A1 | 7/2014 | Miller et al. |
| 2015/0020892 A1 | 1/2015 | Behr et al. |
| 2015/0039187 A1 | 2/2015 | Friebel |
| 2015/0081178 A1 | 3/2015 | Billaud et al. |
| 2016/0108602 A1 | 4/2016 | Singh et al. |
| 2017/0335540 A1 | 11/2017 | Hill |
| 2018/0238015 A1 * | 8/2018 | Fey .................. E02F 3/364 |
| 2018/0238016 A1 | 8/2018 | Seacat et al. |

FOREIGN PATENT DOCUMENTS

| | | | |
|---|---|---|---|
| JP | 56101402 A | * | 8/1981 |
| WO | 2008138932 | | 11/2008 |

* cited by examiner

SYSTEMS AND METHODS FOR COUPLING AN IMPLEMENT TO A WORK VEHICLE

BACKGROUND

The present disclosure relates generally to systems and methods for coupling an implement to a work vehicle.

Certain work vehicles (e.g., tractors, harvesters, skid steers) couple to implements configured to perform work. The implements may include blades, augers, backhoes, trenchers, buckets, rakes, brooms, grapples, or other suitable pieces of equipment. The implements may couple to the work vehicle to form one or more connections. However, the process of coupling the implements to the work vehicle to form the one or more connections may be time consuming and inefficient. Additionally, for work vehicles that use an arm to support the implements, forces may be transmitted from the implements to a chassis of the work vehicle through the arm. Unfortunately, a maximum force rating of the implements may be limited due to this arrangement.

BRIEF DESCRIPTION

In one embodiment, a system configured to couple an implement to a work vehicle includes a first lock assembly coupled to an arm of the work vehicle, and the first lock assembly includes a first lock, a second lock, and a first actuator configured to drive the first lock and the second lock laterally outwardly to engage respective first openings formed in the implement. The system also includes a second lock assembly coupled to a frame of the work vehicle, and the second lock assembly includes a third lock, a fourth lock, and a second actuator configured to drive the third lock and the fourth lock laterally outwardly to engage respective second openings formed in the implement.

In one embodiment, a system includes an implement having a pair of first openings and a pair of second openings. The system also includes a work vehicle having a first lock assembly coupled to an arm of the work vehicle, and the first lock assembly includes a first lock, a second lock, and a first actuator configured to drive the first lock and the second lock laterally to engage the pair of first openings of the implement to form a first connection between the implement and the arm of the work vehicle. The work vehicle also includes a second lock assembly coupled to a frame of the work vehicle, and the second lock assembly includes a third lock, a fourth lock, and a second actuator configured to drive the third lock and the fourth lock laterally to engage the pair of second openings formed in the implement to form a second connection between the implement and the frame of the work vehicle.

In one embodiment, a method includes aligning a first lock and a second lock of a first lock assembly that is coupled to an arm of a work vehicle with respective first openings of an implement and actuating a first actuator of the first lock assembly to drive the first lock and the second lock laterally outwardly to engage the respective first openings of the implement to form a first connection between the implement and the arm of the work vehicle. The method further includes aligning a third lock and a fourth lock of a second lock assembly that is coupled to a frame of the work vehicle with respective second openings of the implement and actuating a second actuator to drive the third lock and the fourth lock laterally outwardly to engage the respective second openings of the implement to form a second connection between the implement and the frame of the work vehicle.

DRAWINGS

These and other features, aspects, and advantages of the present disclosure will become better understood when the following detailed description is read with reference to the accompanying drawings in which like characters represent like parts throughout the drawings, wherein.

Figure 1:
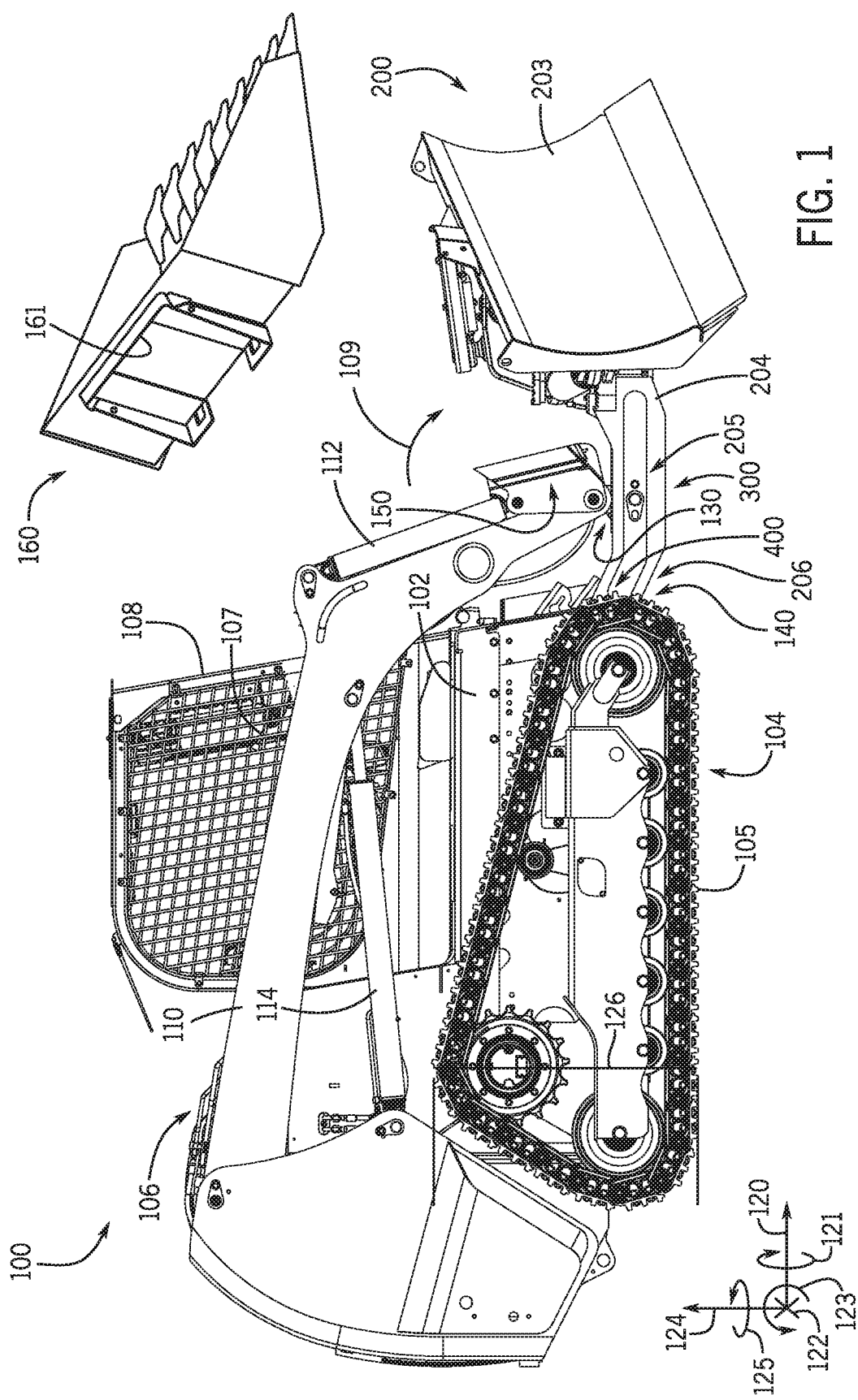
FIG. 1 is a side view of a work vehicle coupled to an implement, in accordance with an embodiment of the present disclosure.
Figure 5A:
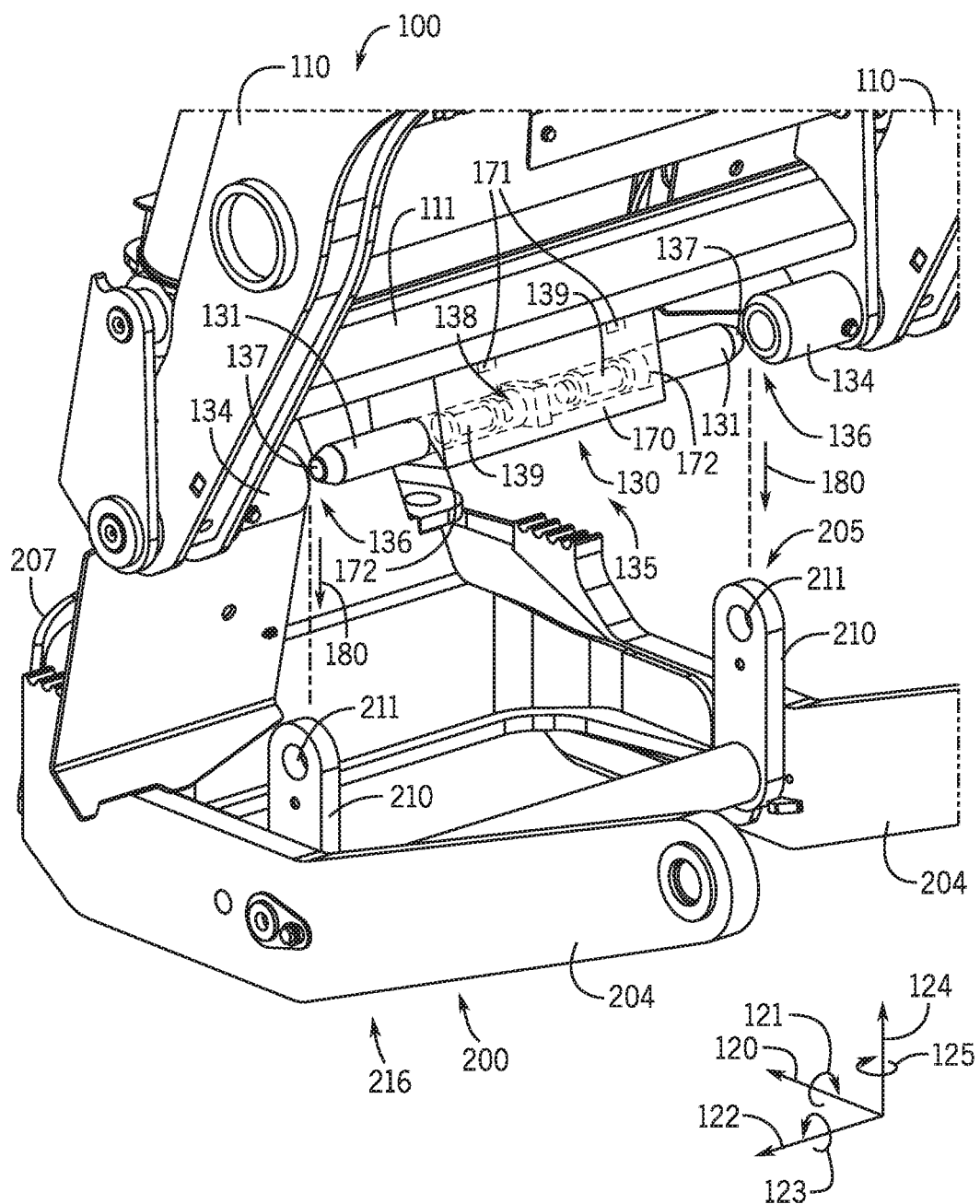
FIG. 5A is a rear perspective view of a portion of the work vehicle and a portion of the implement of FIG. 1 prior to being coupled to one another via the first lock assembly, in accordance with an embodiment of the present disclosure.
Figure 5B:
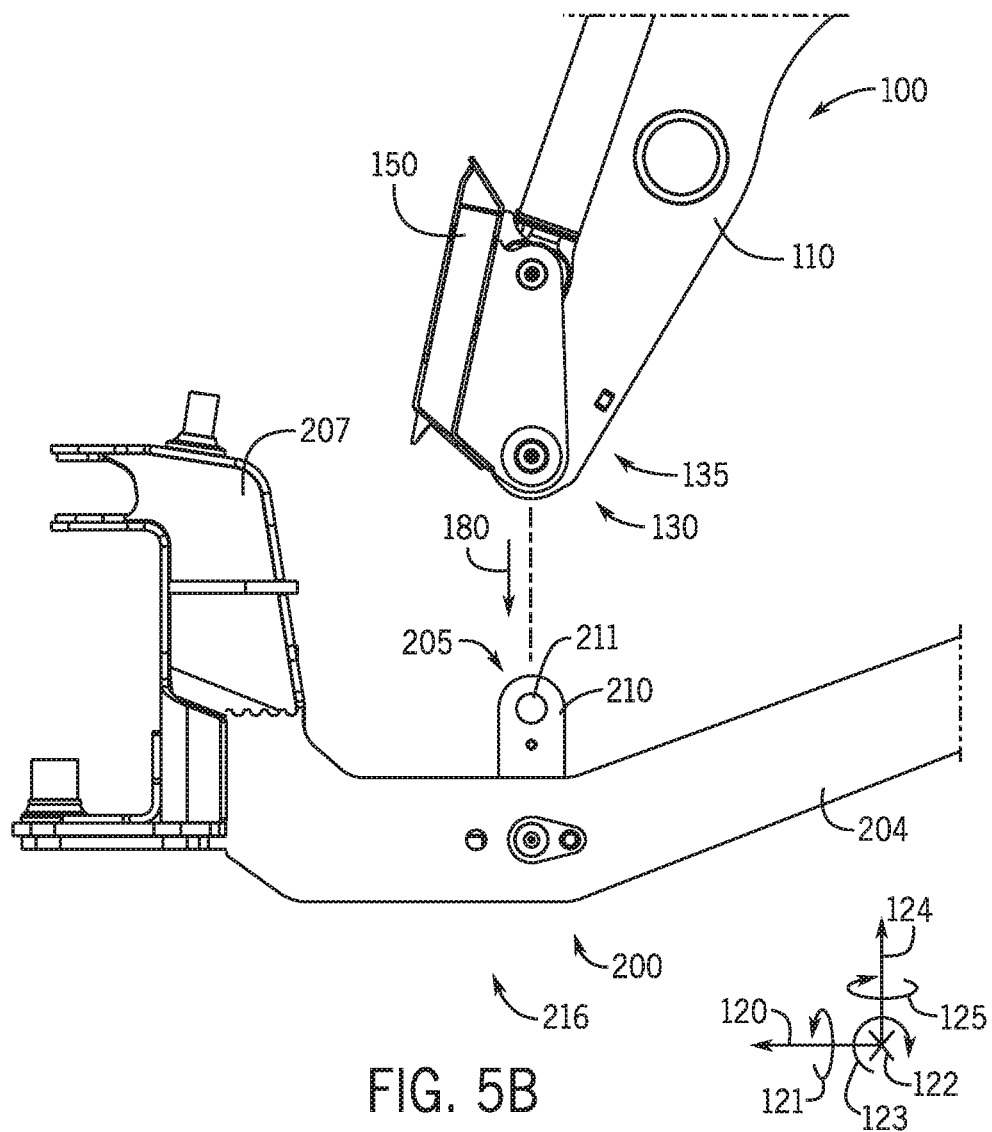
FIG. 5B is a side view of a portion of the work vehicle and a portion of the implement of FIG. 1 prior to being coupled to one another via the first lock assembly, in accordance with an embodiment of the present disclosure.
Figure 5C:
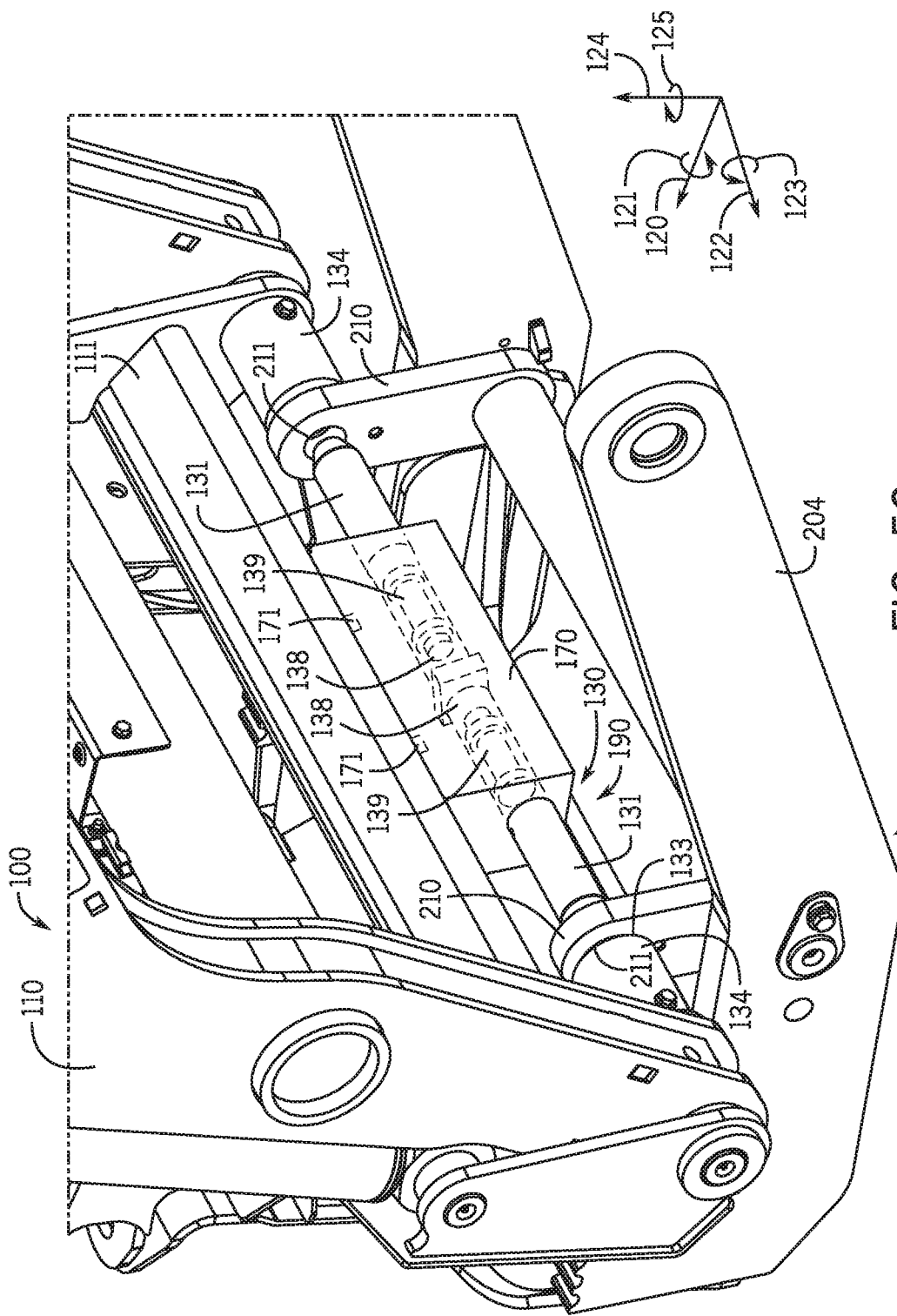
FIG. 5C is a rear perspective view of a portion of the work vehicle and a portion of the implement of FIG. 1 coupled to one another via the first lock assembly, wherein the first lock assembly is a double rod hydraulic cylinder, in accordance with an embodiment of the present disclosure.
Figure 5D:
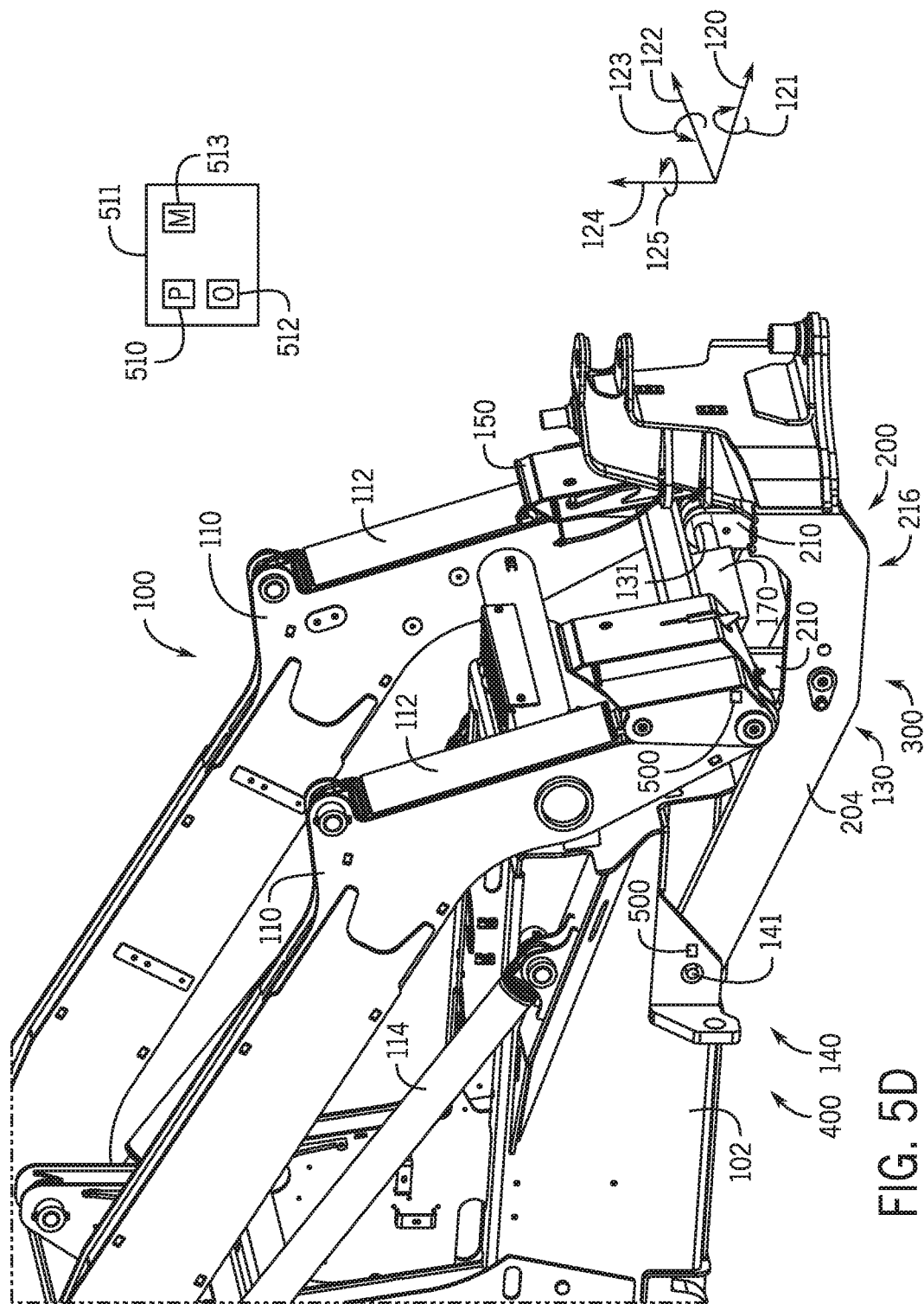
Figure 6:
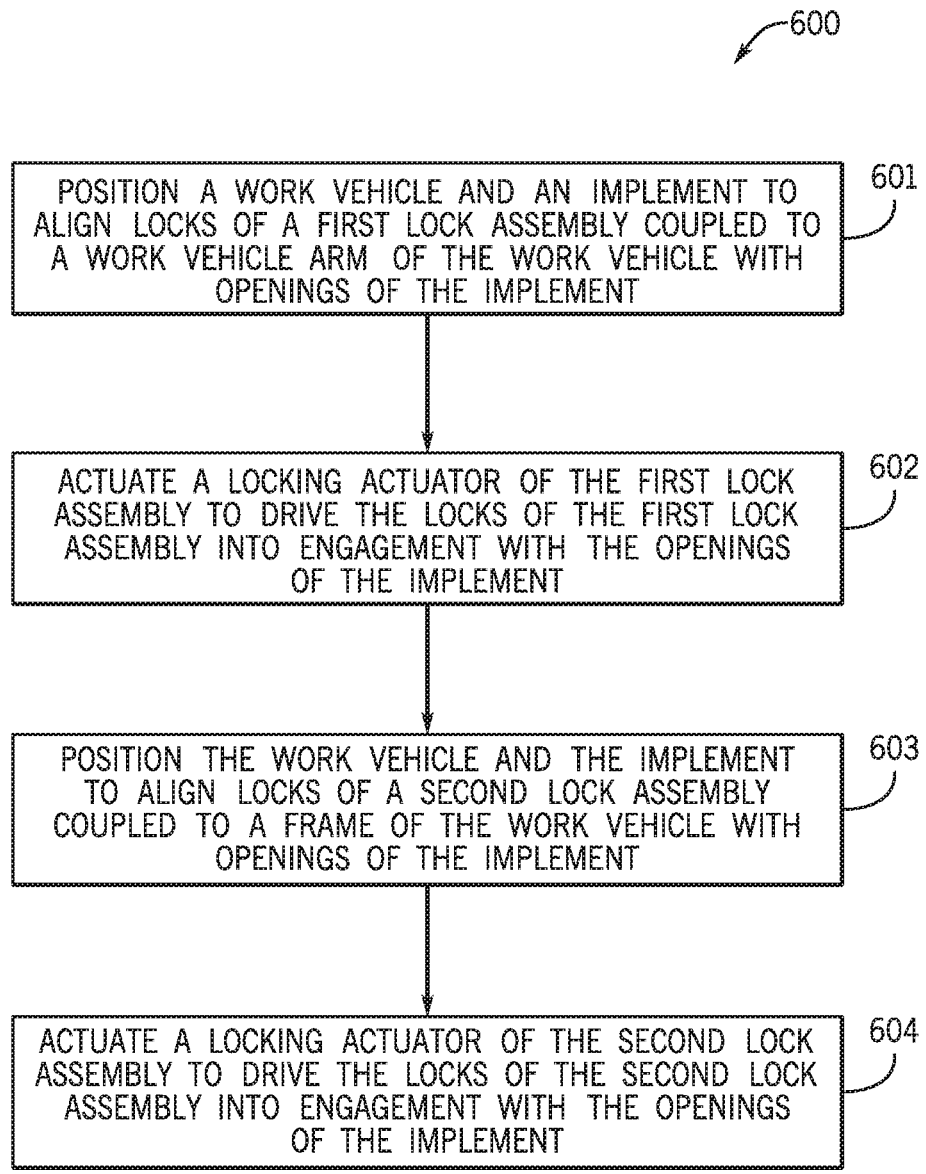

FIG. 5D is a front perspective view of a portion of the work vehicle and a portion of the implement of FIG. 1 coupled to one another via the first lock assembly and the second lock assembly, in accordance with an embodiment of the present disclosure; and FIG. 6 is a flow diagram of a method for coupling the work vehicle and the implement of FIG. 1, in accordance with an embodiment of the present disclosure.

DETAILED DESCRIPTION

Certain embodiments disclosed herein relate generally to systems and methods for coupling an implement to a work vehicle. The systems and methods may efficiently form one or more connections between the implement and the work vehicle. For example, a first connection may be formed between the implement and work vehicle arms of the work vehicle via a first lock assembly, and a second connection may be formed between the implement and a frame of the work vehicle via a second lock assembly. The first lock assembly may include one or more locking actuators that drive one or more locks (e.g., pins) to engage a first mounting portion (e.g., openings formed in brackets that extend from implement arms) of the implement. The second lock assembly may include one or more locking actuators that drive one or more locks (e.g., pins) to engage a second mounting portion (e.g., openings formed in rearward end portions of the implement arms) of the implement.

The second connection may be located within the frame of the work vehicle (e.g., between opposite lateral sides of the frame and/or between opposite lateral wheels or tracks of the work vehicle). The second connection may also be located at a vertical position that is low to the ground (e.g., vertically below a seat and/or a cab for an operator of the work vehicle; vertically aligned with the wheels or the tracks of the work vehicle). Due to the second connection, horizontal forces experienced by the implement are transferred directly to the frame of the work vehicle. Accordingly, a force rating of the implement may be increased (e.g., as compared to implements that are only connected to the work vehicle arms of the work vehicle).

The first connection and the second connection disclosed herein are designed to facilitate efficient coupling of the implement to the work vehicle. The features of the first connection disclosed herein are particularly useful for implements that may benefit from the additional support provided by the second connection to the frame of the work vehicle (e.g., for implements, such as dozer blades, that experience large horizontal forces). In particular, the features of the first connection enable the implement to be efficiently coupled to the work vehicle arms of the work vehicle, while also then facilitating positioning of the implement to be efficiently coupled to the frame of the work vehicle via the second connection. Advantageously, the first connection and the second connection may be devoid of components that tip or that otherwise rely on tipping motions to couple the implement to the work vehicle.

However, in some embodiments, the work vehicle may include other components (e.g., a third lock assembly) that are configured to engage corresponding mounting portions (e.g., corresponding receiver) of other implements via tipping motions to form at least one connection. Thus, the work vehicle may efficiently couple to some implements via the first connection and the second connection to carry out certain operations, and the work vehicle may couple to other implements via at least one different connection (e.g., via the third lock assembly) to carry out other operations.

Turning now to the drawings, FIG. 1 is a side view of a work vehicle 100 coupled to an implement 200, in accordance with an embodiment of the present disclosure. The work vehicle 100 has a frame 102 that is supported and moved by a drive system 104 that includes a rolling assembly 105 (e.g., tracks that rotate about wheels). It should be appreciated that the rolling assembly 105 may instead include multiple wheels that contact and roll along the ground.

A work vehicle arm assembly 106 includes an arrangement of structural members, as well as other components that enable the operator to manipulate the implement 200. For example, the work vehicle arm assembly 106 includes actuators that are controllable via one or more operator controls 107 (e.g., hand controller(s) or lever(s)) to manipulate the implement 200. The one or more operator controls 107 may also enable the operator to control movement (e.g., travel relative to the ground) of the work vehicle 100. The one or more operator controls 107 may be positioned within a cab of the work vehicle 100, and the cab may at least partially surround the operator during operation of the work vehicle 100. A door may provide operator ingress/egress to the cab, and a window or opening 108 may enable the operator to view the implement 200 and a work environment exterior to the work vehicle 100.

As shown, the implement 200 includes a working component 203 (e.g., blade), and the work vehicle arm assembly 106 includes work vehicle arms 110 that extend forward of the frame 102 of the work vehicle 100 and couple to the implement 200. In particular, the work vehicle arm assembly 106 may include one work vehicle arm 110 on each lateral side of the work vehicle 100. Each work vehicle arm 110 is coupled to and/or supports a lift actuator 114 configured to extend or contract to lift (e.g., vertically lift) the work vehicle arms 110 (and the implement 200, when the implement 200 is coupled to the work vehicle arms 110) relative to the work vehicle 100 and relative to the ground.

In FIG. 1, various axes and directions are illustrated to facilitate discussion and understanding of certain movements of the implement 200 and/or the work vehicle 100. For example, as shown, a longitudinal axis 120 corresponds to a forward direction of travel of the work vehicle 100. A rotational movement 121 of the implement 200 about the longitudinal axis 120 may be referred to as "tilt." A lateral axis 122 corresponds to a lateral or side direction with respect to the work vehicle 100. A rotational movement 123 of the implement 200 about the lateral axis 122 may be referred to as "pitch." A vertical axis 124 extends in a vertical direction with respect to the work vehicle 100. A rotational movement 125 of the implement 200 about the vertical axis 124 may be referred to as "yaw." In operation, the actuators that are coupled to and/or supported by the implement 200 may be coupled to hoses (e.g., hydraulic hoses) of the work vehicle 100, and hydraulic fluid may be provided through the hoses to the hydraulic cylinders to drive rotation of the implement 200 about the axes 120, 122, 124. The flow of the hydraulic fluid may be controlled via the one or more operator controls 107. For example, the implement 200 may be coupled to and/or support a tilt actuator that drives the rotational movement 121 of the implement 200, a pitch actuator that drives the rotational movement 123 of the implement 200, and/or a yaw actuator that drives the rotational movement 125 of the implement 200.

In the illustrated embodiment, the implement 200 is configured to couple to the work vehicle 100 to form two connections between the implement 200 and the work vehicle 100. As shown, the implement 200 includes implement arms 204 that extend rearward of the working component 203. In particular, the implement arms 204 include one implement arm 204 on each lateral side of the implement 200. A first connection 300 between the implement 200 and the work vehicle arms 110 of the work vehicle 100 may be formed via a first lock assembly 130, and a second connection 400 between the implement 200 and the frame 102 of the work vehicle 100 may be formed via a second lock assembly 140.

As discussed in more detail below, the first lock assembly 130 may include one or more locking actuators (e.g., first actuator) that drive one or more locks (e.g., pins; first lock and second lock) to engage a first mounting portion 205 (e.g., openings formed in brackets that extend from implement arms) of the implement 200, and the second lock assembly 140 may include one or more locking actuators (e.g., second actuator) that drive one or more locks (e.g., pins; third lock and fourth lock) to engage a second mounting portion 206 (e.g., openings formed in rearward end portions of the implement arms 204) of the implement 200.

It should be appreciated that the implement 200 may be configured to couple to the work vehicle 100 to form only one connection (e.g., only the first connection 300). However, as discussed above, coupling the implement 200 to the work vehicle 100 via both the first connection 300 and the second connection 400 enables the work vehicle 100 to apply a larger force to the implement 200 and/or perform a greater amount of work with the implement 200 (e.g., as compared to an implement coupled to the work vehicle 100 via only the first connection 300 or other connection at the work vehicle arms 110).

As shown, the second connection 400 is located within the frame 102 of the work vehicle 100 (e.g., between opposite lateral sides of the frame 102 and/or between the rolling assemblies 105 of the work vehicle 100). The second connection 400 may also be located at a vertical position that is low to the ground (e.g., vertically below a seat and/or a cab for the operator of the work vehicle 100; vertically aligned with or within a vertical extent 126 of the rolling assemblies 105 of the work vehicle 100). Due to the second connection 400, horizontal forces experienced by the implement 200 are transferred directly to the frame 102 of the work vehicle 100.

The first connection 300 and the second connection 400 disclosed herein are designed to facilitate efficient coupling of the implement 200 to the work vehicle 100. The features of the first connection 300 disclosed herein are particularly useful for a type of the implement 200 that may benefit from the additional support provided by the second connection 400 to the frame 102 of the work vehicle 100. For example, the first connection 300 and the second connection 400 may be utilized for a blade (e.g., bulldozer blade). In some embodiments, the implement 200 is coupled to the work vehicle 100 only via the first connection 300 and/or the second connection 400.

In some embodiments, the work vehicle 100 may include other components that couple to other implements via a tipping motion. For example, the work vehicle 100 may include a third locking assembly 150 that is configured to couple to a corresponding mounting portion 161 of another implement 160 via a tipping motion to form a respective connection and to enable the work vehicle 100 to drive movement of the other implement 160. In particular, a tip cylinder 112 may extend to tip the third locking assembly 150 in the direction of arrow 109 (e.g., rotational movement about the lateral axis 122) to engage the corresponding mounting portion 161 of the implement 160, and then the tip cylinder 112 may retract to couple the implement 160 to the work vehicle 100.

The implement 160 may be coupled to the work vehicle 100 only via the third lock assembly 150. However, in some embodiments, the implement 160 may include implement arms (e.g., similar to the implement arms 204 of the implement 200) and may also be coupled to the frame 102 (e.g., via the second lock assembly 140). While the tipping motion of the third locking assembly 150 may efficiently couple some implements (e.g., the implement 160 or implements that are not coupled to the frame 102 of the work vehicle 100) to the work vehicle 100, the third locking assembly 150 may make it difficult and/or time consuming to the position the implement 200 to efficiently couple the implement 200 to the frame 102 of the work vehicle 100.

In contrast, the first connection 300 and the second connection 400 may be devoid of components that tip or that otherwise rely on a tipping motion to couple the implement 200 to the work vehicle 100. Instead, the features of the first connection 300 enable the implement 200 to be efficiently coupled to the arms 110 of the work vehicle 100, while also then facilitating positioning of the implement 200 to be efficiently coupled to the frame 102 of the work vehicle 100 via the second connection 400.

Thus, the work vehicle 100 may efficiently couple to some implements (e.g., the implement 200) via the first connection 300 alone or in combination with the second connection 400, and the work vehicle 100 may couple to other implements (e.g., the implement 160) via at least one different connection (e.g., via the third locking assembly 150 alone or in combination with the second locking assembly 140). The implement 200 may be any of a variety of implements, such as an asphalt miller, a bale spear, a barrier lift, a bucket, a backhoe, a cold planer, a concrete claw, demolition equipment, a dozer blade, a grapple bucket, a harley rake, a hydraulic brush cutter, a forestry mulcher, a pallet fork, a post driver, a rock saw, a root grapple, a rotary broom, a stump grinder, a tiller, a tree shear, a trench digger, or a vibratory roller, among others.

Figure 2:
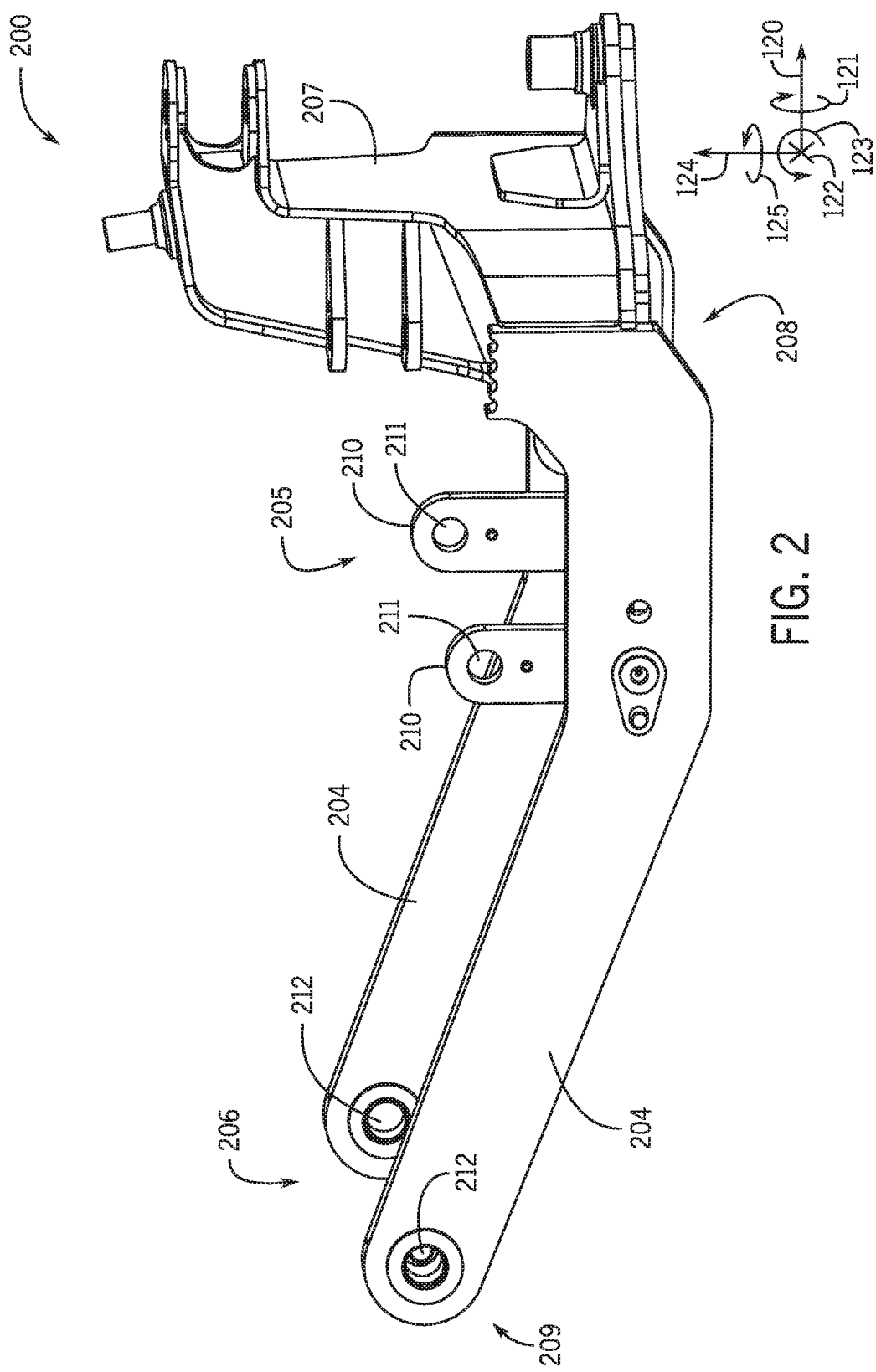
FIG. 2 is a front perspective view of a portion of the implement of FIG. 1, in accordance with an embodiment of the present disclosure.

FIG. 2 is a front perspective view of an embodiment of a portion of the implement 200 that may be coupled to the work vehicle 100. As shown, the implement 200 includes a connector 207 that is configured to couple to (e.g., via one or more fasteners, such as bolts) to the working component 203 (FIG. 1). The implement 200 also includes the implement arms 204 that extend between a first end portion 208 (e.g., forward end portion) and a second end portion 209 (e.g., rearward end portion). In the illustrated embodiment, the first mounting portion 205 includes brackets 210 (e.g., one bracket 210 on each implement arm 204) that extend vertically and/or crosswise relative to the implement arms 204. Furthermore, each bracket 210 includes a respective opening 211 (e.g., recess or through hole), which is configured to receive a respective lock (e.g., pin) of the first locking assembly 130 to form the first connection 300 (FIG. 1). In the illustrated embodiment, the second mounting portion 206 includes openings 212 (e.g., recess or through hole) formed at the respective second end portion 209 of each implement arm 204. Each opening 212 is configured to receive a respective lock (e.g., pin) of the second locking assembly 140 to form the second connection 400 (FIG. 1).

Figure 3:
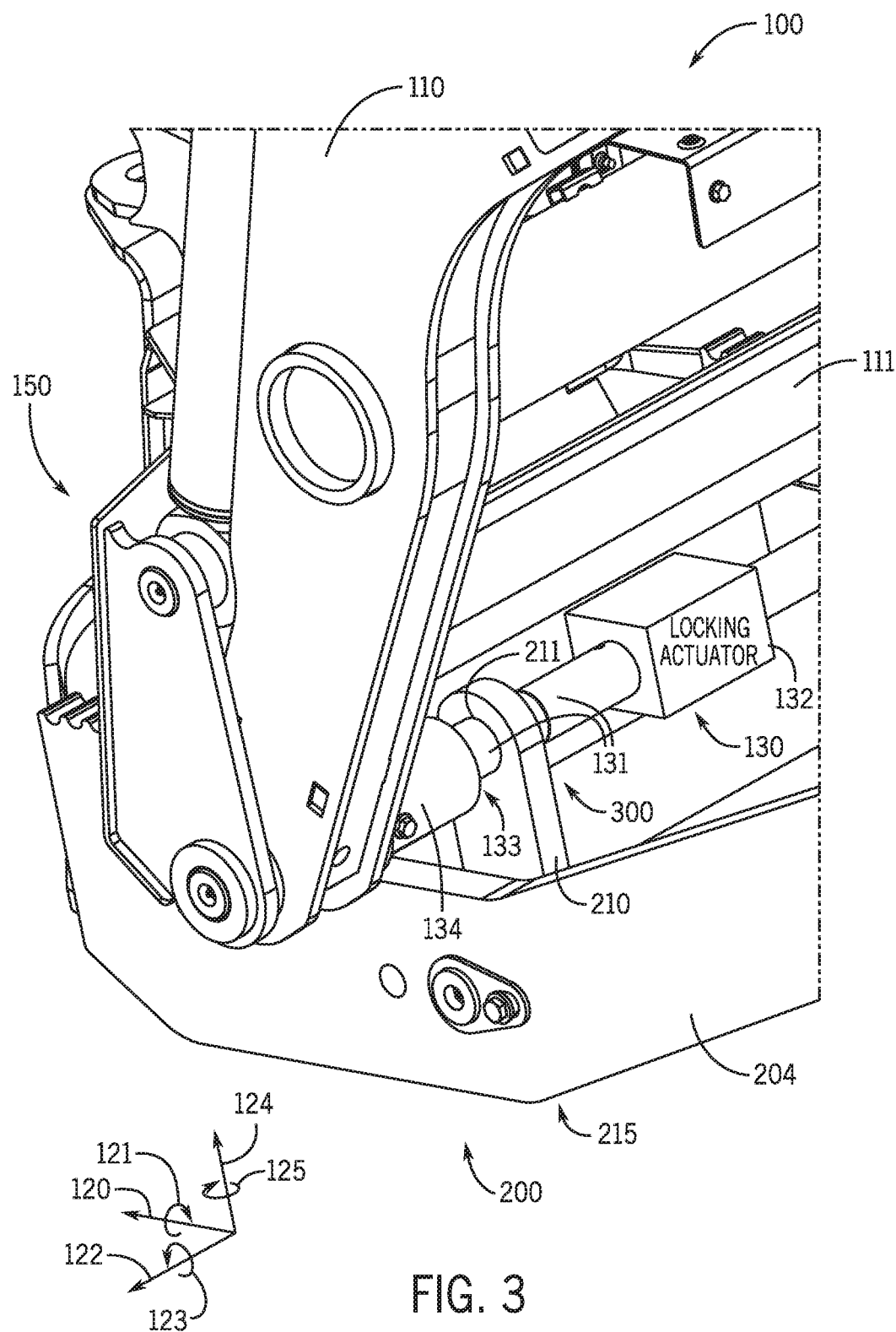
FIG. 3 is a rear perspective view of a portion of the work vehicle and a portion of the implement of FIG. 1 coupled to one another via a first lock assembly, in accordance with an embodiment of the present disclosure.

FIG. 3 is a rear perspective view of an embodiment of a portion of the implement 200 and a portion of the work vehicle 100 coupled to one another via the first locking assembly 130. While only one side (e.g., a left hand side during travel of the work vehicle 100) is shown to facilitate discussion, it should be appreciated that the same components may be provided on the other side of the work vehicle 100 (e.g., a right hand side).

As shown, a lock 131 (e.g., pin) extends laterally through the opening 211 in the bracket 210, which may be coupled to (e.g., via one or more fasteners, such as bolts) or integrally formed with the implement arm 204. The lock 131 may be driven by a locking actuator 132, which may be coupled to (e.g., via one or more fasteners, such as bolts) or otherwise supported by the work vehicle arms 110. To facilitate discussion, the locking actuator 132 is illustrated schematically, as various different types of actuators (e.g., hydraulic actuators, pneumatic actuators, electric actuators) may be used to drive the lock 131 laterally (e.g., laterally-outwardly) through the opening 211. The lock 131 may extend through the opening 211 (e.g., from a laterally-inner side to a laterally-outer side of the opening 211) and into an opening 133 (e.g., recess or through hole) formed in the work vehicle arm 110 or in a support structure 134 that extends laterally (e.g., laterally-inwardly) from the work vehicle arm 110. As noted above, it should be appreciated that another lock 131 may be provided on the opposite lateral side of work vehicle 100 to engage the opening 211 in the bracket 210 on the opposite lateral side of the implement 200. These locks 131 may both be driven by the locking actuator 132 (e.g., double rod cylinder), or these locks 131 may be driven by separate locking actuators (e.g., the locking actuator 132 and another locking actuator).

As shown, a support beam 111 extends laterally to couple to each of the work vehicle arms 110. The support beam 111 structurally supports the work vehicle arms 110 to enable the work vehicle 100 to support a higher load and/or perform a greater amount of work (e.g., as compared to an arm assembly without a support beam). The support beam 111 may also structurally support some or all of the components of the first locking assembly 130. For example, the locking actuator 132 (or a housing surrounding the locking actuator 132 and/or the lock 131) may be coupled to (e.g., via one or more fasteners, such as bolts) the support beam 111. Any suitable number of support beams of any suitable shape may be provided. Additionally, as shown, the work vehicle 100 may include the optional third locking assembly 150.

Figure 4:
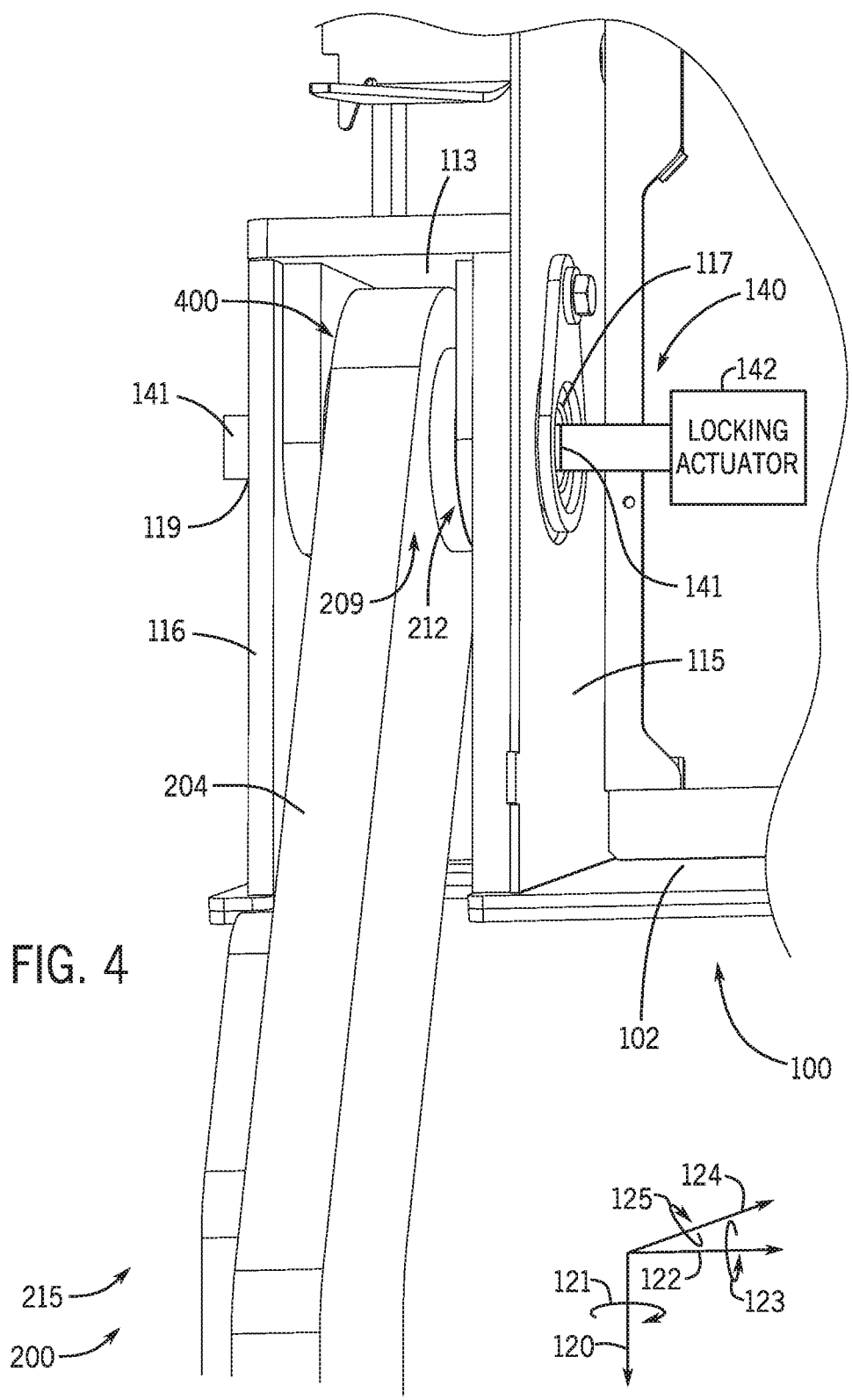
FIG. 4 is a bottom view of a portion of the work vehicle and a portion of the implement of FIG. 1 coupled to one another via a second lock assembly, in accordance with an embodiment of the present disclosure.

FIG. 4 is a bottom view of an embodiment of a portion of the implement 200 and a portion of the work vehicle 100 coupled to one another via the second locking assembly 140. While only one side (e.g., a left hand side during travel of the work vehicle 100) is shown to facilitate discussion, it should be appreciated that the same components may be provided on the other side of the work vehicle 100 (e.g., a right hand side).

As shown, a lock 141 (e.g., pin) extends laterally through the opening 212 formed at the second end portion 209 of the implement arm 204. The lock 141 may be driven by a locking actuator 142 that is coupled to (e.g., via one or more fasteners, such as bolts) or otherwise supported by the frame 102 of the work vehicle 100. To facilitate discussion, the locking actuator 142 is illustrated schematically, as various different types of actuators (e.g., hydraulic actuators, pneumatic actuators, electric actuators) may be used to drive the lock 141 laterally (e.g., laterally-outwardly) through the opening 212.

In the illustrated embodiment, the second end portion 209 of the implement arms 204 is positioned within a receptacle 113 formed between a laterally-inner wall 115 and a laterally-outer wall 116 of the frame 102 of the work vehicle 100. In some such embodiments, the lock 141 may extend through an opening 117 (e.g., through hole) in the laterally-inner wall 115 of the frame 102 of the work vehicle 100, through the opening 212 in the implement arm 204, and into or through an opening 119 (e.g., recess or through hole) formed in the laterally-outer wall 116 of the frame 102 of the work vehicle 100. As noted above, it should be appreciated that another lock 141 may be provided on the opposite lateral side of work vehicle 100 to engage the opening 212 in the implement arm 204 on the opposite lateral side of the implement 200. These locks 141 may both be driven by the locking actuator 142 (e.g., double rod cylinder), or these locks 141 may be driven by separate locking actuators (e.g., the locking actuator 142 and another locking actuator). In FIGS. 3 and 4, the implement 200 is in an attached position 215 in which the locks 131, 141 engage the openings 211, 212 of the implement 200 to enable the work vehicle 100 to manipulate the implement 200.

With the foregoing in mind, FIG. 5A is a rear perspective view of a portion of the work vehicle 100 and a portion of the implement 200 prior to being coupled to one another via the first lock assembly 130. In particular, the implement 200 is in an unattached position 216 in which the locks 131, 141 do not engage the openings 211, 212 of the implement 200. As shown, when the implement 200 is in the unattached position 216, the first lock assembly 130 is in an unlocked position 135 in which the locks 131 are retracted to provide gaps 136 between laterally-outer ends 137 of the locks 131 and the support structures 134 of the work vehicle arms 110. The gaps 136 are sized (e.g., have a dimension along the lateral axis 122) that enables the gaps 136 to receive the brackets 210 of the implement 200, such as by moving the work vehicle arms 110 in the direction of arrows 180.

A housing 170 may be part of or surround the first lock assembly 130. The housing 170 may be coupled to the work vehicle arms 110, such as to the support beam 111 via one or more fasteners 171. The housing 170 may have openings 172 that enable the locks 131 to extend laterally from the housing 170 to engage the openings 211 in the brackets 210. In the illustrated embodiment, the locking actuator 132 is a hydraulically-actuated double rod cylinder with one or more chambers 138 that are configured to receive a fluid from a fluid source and piston rods 139 that are coupled to or integrally formed with the locks 131. However, the locking actuator 132 may have any of a variety of forms and/or more than one locking actuator may be provided (e.g., the locks 131 may be driven by separate locking actuators). To facilitate understanding of the relative positions of the various components, FIG. 5B is a side view of a portion of the work vehicle 100 and a portion of the implement 200 prior to being coupled to one another via the first lock assembly 130.

FIG. 5C is a rear perspective view of a portion of the work vehicle 100 and a portion of the implement 200 coupled to one another via the first lock assembly 130 that is illustrated in FIG. 5A. In particular, the implement 200 is in the attached position 215 and the first lock assembly 130 is in a locked position 190 in which the locks 131 engage the openings 211 of the implement 200 (e.g., the locks 131 extend through the openings 211 and into the openings 133 formed in the support structure 134).

To transition from the unattached position 216 of FIGS. 5A and 5B to the attached position 215 of FIG. 5C, the operator may position the work vehicle 100 and the implement 200 to align (e.g., along the longitudinal axis 120 and the vertical axis 124) the locks 131 with the openings 211 of the implement 200. The operator may align the locks 131 with the openings 211 in any of a variety of ways, including manually moving the implement 200, driving the work vehicle 100 toward the implement 200, and/or adjusting the work vehicle arms 110 (e.g., via the lift actuator 114 [FIG. 1]) until the locks 131 align with the openings 211.

Once the locks 131 align with the openings 211, the first lock assembly 130 may be driven from the unlocked position 135 to the locked position 190 in any of a variety of ways. For example, the locking actuator 132 may be actuated by providing a fluid (e.g., a hydraulic fluid from a hydraulic fluid source) to the one or more chambers 138 to drive the piston rods 139 and the locks 131 laterally-outwardly and away from one another. In some embodiments, the operator may provide an input to actuate the locking actuator 132 via the one or more operator controls 107 (FIG. 1) or other operator controls (e.g., located outside of the cab, on the first lock assembly 130, and/or on the work vehicle arms 110). It should be appreciated that the locking actuator 142 (FIG. 4) may have similar features to the locking actuator 132 shown in FIGS. 5A-C (e.g., the locking actuator 142 may be a double rod cylinder that is supported within a housing that is coupled to the frame 102 and/or the work vehicle arms 110).

FIG. 5D is a front perspective view of a portion of the work vehicle 100 and a portion of the implement 200 coupled to one another via the first lock assembly 130 and the second lock assembly 140. Parts of the work vehicle 100 (e.g., the rolling assembly 105 shown in FIG. 1) and parts of the implement 200 (e.g., the work component 203 shown in FIG. 1) are removed for clarity. As shown, the locks 131 of the first lock assembly 130 engage the openings 211 of brackets 210 of the implement 200, and the locks 141 of the second lock assembly 140 engage the openings 212 of the implement arm 204 of the implement 200.

As noted above, the first connection 300 and the second connection 400 may formed in any of a variety of ways. Furthermore, the first connection 300 and the second connection 400 may made simultaneously or sequentially. For example, the implement 200 and the work vehicle 100 may be positioned to align the locks 131 of the first lock assembly 130 with the openings 211, and then the locking actuator 132 of the first lock assembly 130 may be actuated to form the first connection 300. Subsequently, the lift actuator 114 may be actuated to cause the implement 200 to rotate relative to the work vehicle 100 and/or to cause at least part of the implement 200 to raise off of the ground until the locks 141 of the second lock assembly 140 align with the openings 212. Once aligned, the locking actuator 142 of the second lock assembly 140 may be actuated to form the second connection 400. In other embodiments, the second connection 400 may be formed prior to the first connection 300.

In some embodiments, to facilitate the process of coupling the implement 200 to the work vehicle 100, the work vehicle 100 may include one or more sensors. For example, the work vehicle 100 may include one or more sensors 500 that detect and output signals that indicate that the locks 131, 141 align with the openings 211, 212. Additionally or alternatively, the locking actuators 132, 142 may output signals that indicate a position of the locks 131, 141 (e.g., retracted position or extended position).

The sensors 500 are illustrated schematically near the first and second lock assemblies 130, 140; however, the sensors 500 may be positioned at any suitable location that enables the sensors 500 to monitor the alignment between the locks 131, 141 and the openings 211, 212. The signals output by the sensors 500 and/or the locking actuators 132, 142 may be processed by a processor 510 of a control system 511 (e.g., electronic control system) of the work vehicle 100. The processor 510 may instruct an output device 512 (e.g., display, speaker) within the cab to provide an indication (e.g., text message, visual signal or symbol, audible alarm) of the respective positions of the components (e.g., that the locks 131, 141 align with the openings 211, 212 and/or that the locks 131, 141 are extended to engage the openings 211, 212). Thus, the operator may actuate the first lock assembly 130 and/or the second lock assembly 140 (e.g., via the operator controls 107) at an appropriate time and/or receive confirmation that the implement 200 is coupled to the work vehicle 100. In some embodiments, some or all of the process to couple the implement 200 to the work vehicle 100 may be automated. For example, the processor 510 may provide a control signal (e.g., to valves to release fluid from the fluid source) to adjust the locking actuators 132, 142 in response to the signals received from the sensors 500 indicating that the locks 131, 141 are aligned with the openings 211, 212. The processor 510 may also be configured to control other aspects of the work vehicle 100, such as various other actuators (e.g., the tip actuator 112, the lift actuator 114). The sensors 500 may include, for example, inductive proximity sensors, capacitive proximity sensors, optical sensors, or any other type of sensor capable of detecting the alignment between the locks 131, 141 and the openings 211, 212.

In the illustrated embodiment, the control system 511 includes the processor 510 and a memory device 513. The control system 511 may also include one or more storage devices and/or other suitable components. The processor 510 may be used to execute software, such as software for controlling the automated coupling process, and so forth. Moreover, the processor 510 may include multiple microprocessors, one or more "general-purpose" microprocessors, one or more special-purpose microprocessors, and/or one or more application specific integrated circuits (ASICS), or some combination thereof. For example, the processor 510 may include one or more reduced instruction set (RISC) processors.

The memory device 513 may include a volatile memory, such as random access memory (RAM), and/or a nonvolatile memory, such as read-only memory (ROM). The memory device 513 may store a variety of information and may be used for various purposes. For example, the memory device 513 may store processor-executable instructions (e.g., firmware or software) for the processor 510 to execute, such as instructions for controlling the work vehicle or controlling the automated coupling process. The storage device(s) (e.g., nonvolatile storage) may include ROM, flash memory, a hard drive, or any other suitable optical, magnetic, or solid-state storage medium, or a combination thereof. The storage device(s) may store data, such as measurements and/or configurations of the implement 200 to assist with controlling the automated coupling process.

FIG. 6 is a flow diagram of an embodiment of a method 600 for coupling the work vehicle 100 to the implement 200. In step 601, the operator may position the work vehicle 100 and the implement 200 to align (e.g., along the longitudinal axis 120 and the vertical axis 124) the locks 131 with the openings 211 of the implement 200. The operator may align the locks 131 with the openings 211 in any of a variety of ways, including manually moving the implement 200, driving the work vehicle 100 toward the implement 200, and/or adjusting the work vehicle arms 110 until the locks 131 align with the openings 211.

In step 602, once the locks 131 align with the openings 211, the operator may instruct actuation of the locking actuator 132 of the first lock assembly 130. As noted above, the operator may instruct actuation by providing an input to adjust the locking actuator 132 via the one or more operator controls 107 (FIG. 1). Upon the input at the one or more operator controls 107, the processor 510 may control a valve to release the fluid from the fluid source to the locking actuator 132, and the fluid may then drive the locks 131 laterally outwardly away from one another to engage the openings 211.

In step 603, the operator may position the work vehicle 100 and the implement 200 to align (e.g., along the longitudinal axis 120 and the vertical axis 124) the locks 141 with the openings 212 of the implement 200. The operator may align the locks 141 with the openings 211, 212 in any of a variety of ways, including manually moving the implement 200, driving the work vehicle 100 toward the implement 200, and/or adjusting the work vehicle arms 110 until the locks 141 align with the openings 212.

In step 604, once the locks 141 align with the openings 212, the operator may instruct actuation of the locking actuator 142 of the second lock assembly 140. As noted above, the operator may instruct actuation by providing an input to adjust the locking actuator 142 via the one or more operator controls 107 (FIG. 1). Upon the input at the one or more operator controls 107, the processor 510 may control a valve to release the fluid from the fluid source to the locking actuator 142, and the fluid may then drive the locks 141 laterally outwardly away from one another to engage the openings 212.

As noted above, in embodiments in which both the first lock assembly 130 and the second lock assembly 140 are employed to attach the implement 200 to the work vehicle 100, the first lock assembly 130 and the second lock assembly 140 may be aligned with the openings 211, 212 and/or moved to the respective locked positions simultaneously or sequentially. Furthermore, portions of the method 600 may be automated and/or performed in response to signals output by the sensors 500 and/or by the locking actuators 132, 142.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system configured to couple an implement to a work vehicle, comprising:
a first lock assembly coupled to an arm of the work vehicle, wherein the first lock assembly comprises a first lock, a second lock, and a first actuator configured to drive the first lock and the second lock laterally outwardly to engage respective first openings formed in the implement, and wherein the first actuator comprises a double rod cylinder comprising at least one chamber that is configured to receive a fluid, a first piston rod coupled to or integrally formed with the first lock, and a second piston rod coupled to or integrally formed with the second lock
a second lock assembly coupled to a frame of the work vehicle, wherein the second lock assembly comprises a third lock, a fourth lock, and a second actuator configured to drive the third lock and the fourth lock laterally outwardly to engage respective second openings formed in the implement; and
a third lock assembly coupled to the arm of the work vehicle, wherein the third lock assembly is configured to engage a corresponding mounting portion of another implement via a tipping motion.

2. The system of claim 1, wherein the first lock and the second lock comprise pins.

3. The system of claim 2, wherein the third lock and the fourth lock comprise pins.

4. The system of claim 1, wherein the system is configured to:
isolate the implement from the third lock assembly while the implement is coupled to the work vehicle via the first lock assembly and the second lock assembly to perform respective work operations; and
isolate the another implement from the first lock assembly while the another implement is coupled to the work vehicle via the third lock assembly or via the second lock assembly and the third lock assembly to perform respective work operations.

5. The system of claim 1, comprising a controller configured to receive one or more signals indicative of a position of the respective first openings formed in the implement from one or more sensors, and to instruct the first actuator to drive the first lock and the second lock laterally outwardly to engage the respective first openings formed in the implement when the one or more signals indicates that the respective first openings formed in the implement are aligned with the first lock and the second lock.

6. The system of claim 1, wherein the first lock assembly forms a first connection between the implement and the work vehicle, and the implement is configured to rotate relative to the work vehicle at the first connection.

7. A system, comprising:
an implement comprising:
a pair of arms; and
a pair of first openings and a pair of second openings, wherein the pair of first openings is located along the pair of arms between a connector positioned at forward end portions of the pair of arms and the pair of second openings positioned proximate to rearward end portions of the pair of arms, wherein the connector is configured to couple to a working component of the implement;
a work vehicle comprising:
a first lock assembly coupled to an arm of the work vehicle, wherein the first lock assembly comprises a first lock, a second lock, and a first actuator configured to drive the first lock and the second lock laterally to engage the pair of first openings of the implement to form a first connection between the implement and the arm of the work vehicle; and
a second lock assembly coupled to a frame of the work vehicle, wherein the second lock assembly comprises a third lock, a fourth lock, and a second actuator configured to drive the third lock and the fourth lock laterally to engage the pair of second openings formed in the implement to form a second connection between the implement and the frame of the work vehicle.

8. The system of claim 7, wherein the work vehicle comprises a third lock assembly coupled to the arm of the work vehicle, the implement is isolated from the third lock assembly when the implement is coupled to the work vehicle, and the first and second connections enable the work vehicle to drive movement of the implement.

9. The system of claim 8, comprising another implement, wherein the third lock assembly is configured to engage a corresponding mounting portion of the another implement via a tipping motion to form a third connection that enables the work vehicle to drive movement of the another implement.

10. The system of claim 7, wherein the implement comprises a dozer blade.

11. The system of claim 7, wherein the first lock and the second lock comprise pins.

12. The system of claim 11, wherein the third lock and the fourth lock comprise pins.

13. The system of claim 7, wherein the first actuator comprises a double rod cylinder comprising at least one chamber that is configured to receive a fluid, a first piston rod coupled to or integrally formed with the first lock, and a second piston rod coupled to or integrally formed with the second lock.

14. The system of claim 7, wherein the implement is coupled to the work vehicle only via the first and second connections.

15. A method, comprising:
aligning a first lock and a second lock of a first lock assembly that is coupled to an arm of a work vehicle with respective first openings of an implement;
while aligning the first lock and the second lock with the respective first openings, actuating a first actuator of the first lock assembly to drive the first lock and the second lock laterally outwardly to engage the respective first openings of the implement to form a first connection between the implement and the arm of the work vehicle;

subsequently aligning a third lock and a fourth lock of a second lock assembly that is coupled to a frame of the work vehicle with respective second openings of the implement; and while aligning the third lock and the fourth lock with the respective second openings, actuating a second actuator to drive the third lock and the fourth lock laterally outwardly to engage the respective second openings of the implement to form a second connection between the implement and the frame of the work vehicle.

16. The method of claim 15, wherein lifting the implement via the arm of the work vehicle causes the implement to rotate about the first connection to align the third lock and the fourth lock of the second lock assembly with the respective second openings of the implement.

17. The method of claim 15, comprising:

aligning a third lock assembly that is coupled to the arm of the work vehicle with a corresponding mounting portion of another implement;

while aligning the third lock assembly with the corresponding mounting portion, engaging the corresponding mounting portion of the another implement via a tipping motion of the third lock assembly to form a third connection between the another implement and the arm of the work vehicle;

performing respective work operations with the implement coupled to the work vehicle via the first connection and the second connection, and not via the third connection; and performing respective work operations with the another implement coupled to the work vehicle via the third connection and the second connection, and not via the first connection.

18. The method of claim 15, comprising:

receiving, at a controller, one or more signals indicative of a position of the respective first openings formed in the implement from one or more sensors; and instructing, using the controller, the first actuator to drive the first lock and the second lock laterally outwardly to engage the respective first openings of the implement in response to the one or more signals indicating that the respective first openings of the implement are aligned with the first lock and the second lock.

19. The method of claim 15, wherein aligning the third lock and the fourth lock of the second lock assembly with the respective second openings of the implement comprises lifting the implement via the arm of the work vehicle.

* * * * *